United States Patent Office 2,894,536
Patented July 14, 1959

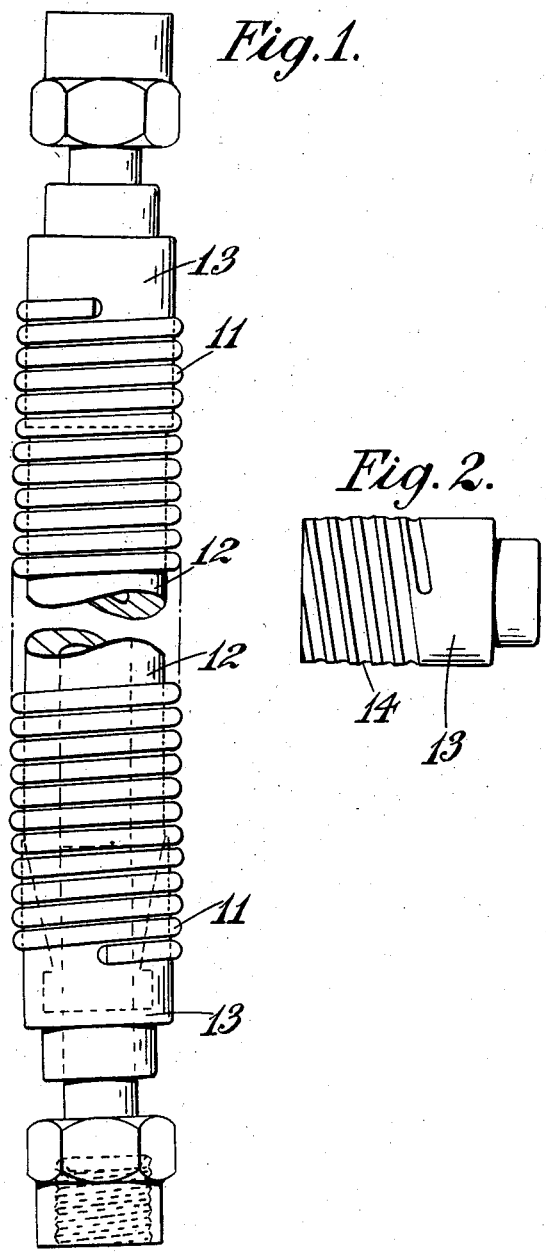

2,894,536

HOSES

Alfred Erwin Reginald Arnot, Basingstoke, England, assignor to Emmanuel Kaye and John Reginald Sharp, both of Basingstoke, England Application September 24, 1957, Serial No. 685,919

Claims priority, application Great Britain September 24, 1956

9 Claims. (Cl. 138—56)

This invention relates to hoses, and in particular to flexible rubber and like hoses such as are used, for example, to provide a flexible connection between a source of hydraulic pressure and a piston-and-cylinder unit or jack. Amongst other uses, hoses of this kind are employed to provide flexible pressure connections on industrial lift trucks.

One type of hose comprises a rubber or braided rubber outer layer, an intermediate layer of wire mesh, and an inner layer of rubber. The intermediate layer strengthens the hose, but does not prevent it from stretching when in use. This stretching, which can be a great disadvantage of flexible hoses, is particularly disadvantageous when the hose passes over pulleys or is otherwise guided in a predetermined path as a connection between a moving part and a relatively fixed part. The stretching, to give a specific instance, amounts to approximately 10% in a 130 inch standard length connection to a lift cylinder on a current design of fork-lift truck.

It is an object of the present invention to provide a flexible hose assembly in which stretching during use is prevented or reduced.

According to the present invention there is provided a prestressed hose assembly comprising a flexible rubber, plastic, metallic or like hose, and spring means in tension along the length of the hose and anchored to the hose to maintain it in a state of longitudinal compression during use. The term "rubber" as used in the present specification is intended to include both natural and synthetic rubber.

In the case where the hose is metallic, it may be of the type made from light gauge metal with a continuous series of fine corrugations, or wound from metal strip with interlocking sections.

Preferably the spring means comprises a coil spring which freely encircles the hose and is anchored to each end thereof. Alternatively, in the case where the hose is made of rubber or plastic, the coil spring may be embedded in the outer or inner layer of the hose material, for example by manufacturing the hoses around a pre-tensioned spring.

The spring may be suitably anchored to each end of the hose by securing it to the metal end connectors which are normally provided at the ends of the hose. Thus the ends of the spring may be screwed over externally threaded fittings, or the end coils of the spring may be closed over reduced portions of the fittings. Alternatively, the spring may be secured to the metal fittings by means of circlips (split rings), or the hose may be provided with collars having annular recesses to receive the ends of the spring, the collars being then crimped on to the spring.

It is known to provide a hose with an external coil of galvanised wire, but the wire does not act as a prestressed tension spring and therefore does not prevent the hose from stretching during use.

The following is a description by way of example of one method of making a prestressed hose assembly in accordance with the invention:

In the accompanying drawing:

Figure 1 is a side view of a hose complete with end connectors and a surrounding spring, in accordance with this invention, part of the surrounding spring being shown broken away; and Figure 2 is a detail to an enlarged scale, of one of the end connectors shown in Figure 1.

A cadmium plated close coiled steel tension spring 11 is close-wound from 14 S.W.G. (0.08 inch) diameter wire to have an internal diameter of 0.50 inch, an initial length of 110 inches, and a minimum initial tension of 5½ pounds. This spring is passed over a rubber hose 12 having an external diameter of 0.50 inch and a length of approximately 122 inches. A metal end connector 13 is then crimped on to each end of the hose. The exterior of each connection 13 is externally screw-threaded at 14 as shown in Figure 2. This can be done by using a crimping tool which will tighten the hose in the connectors and also form a spiral thread on the outside of the connector. One end of the spring 11 is screwed on to one end connection 13 and the other end is given a few turns in a direction against the coils, stretched to reach the other end connection 13, and then released so that it screws itself on to the connection. The spring 11 is initially made slightly shorter than the hose which tends to increase its initial tension somewhat, and it is found that it prevents stretching of the rubber hose when in use. The spring also provides a protective armouring for the hose, although this is not its primary function.

The spring 11 may be made of any other suitable material, preferably a corrosion resistant and wear resistant material. The hose described is intended for use as a running connection from a fluid pressure supply to an operating jack on a fork lift truck, in which situation it will pass over pulleys, and it is therefore advantageous that the outer covering of the hose, in this case the spring, being metallic, is resistant to wear.

It will be understood that the initial tension of spring 11 may be made sufficient to prevent extension under the working pressure and the higher the working pressure the stronger the initial tension required.

I claim:

1. A prestressed hose assembly comprising a flexible smooth-walled hose and spring means in tension along the length of the hose and anchored to the hose to maintain it in a state of longitudinal compression sufficient to substantially prevent stretching of the hose during use.

2. A prestressed hose assembly as claimed in claim 1 wherein the spring means comprises a coil spring which freely encircles the hose and is anchored to each end thereof.

3. A prestressed hose assembly according to claim 2 wherein the coil spring is close wound and provided with an initial tension in its free state.

4. A prestressed hose assembly comprising a flexible smooth-walled rubber hose and a coil spring in tension freely encircling the hose and anchored to each end thereof to maintain the hose in a state of longitudinal compression sufficient to substantially prevent stretching of the hose during use.

5. A prestressed hose assembly comprising an inner smooth-walled flexible hose, connectors secured to the end thereof and a coil spring encircling the hose and secured at each end to the connectors, the coil spring being under tension so that it places the hose under sufficient longitudinal compression during use to substantially prevent stretching.

6. A hose assembly as claimed in claim 5 wherein the hose is secured to the end connectors by means of a screw thread on each connector on to which the coils of the spring fit.

7. A hose assembly as claimed in claim 5 wherein the coil spring is close-wound and provided with an initial tension in its free state.

8. A prestressed hose assembly comprising an inner flexible smooth-walled hose, screw-threaded connectors secured to each end thereof, a close wound coil spring, which has an initial tension in its free state, encircling the hose and secured to said connectors by engagement with the screw-threads thereon, whereby the hose is maintained in a state of longitudinal compression to prevent stretching during use.

9. A prestressed hose assembly according to claim 8 wherein the inner flexible hose is of rubber.

References Cited in the file of this patent

UNITED STATES PATENTS

| | | |
|---|---|---|
| 858,575 | Clafin | July 2, 1907 |
| 2,524,679 | Roberts | Oct. 3, 1950 |
| 2,739,616 | Duff | Mar. 27, 1956 |

FOREIGN PATENTS

| | | |
|---|---|---|
| 472,094 | Canada | Mar. 13, 1951 |